United States Patent [19]
McDonald et al.

[11] Patent Number: 5,804,067
[45] Date of Patent: Sep. 8, 1998

[54] APPARATUS FOR MAGNETIC TREATMENT OF LIQUIDS

[75] Inventors: Wallace John McDonald; Kevin James Humphreys; Reginald Duncan Humphreys; Karl Rudolph Kopecky, all of Edmonton; Gary Wayne Adams, Calgary, all of Canada

[73] Assignee: Hydroworld International (Canada), Ltd., Edmonton, Canada

[21] Appl. No.: 678,518

[22] Filed: Jul. 9, 1996

[30] Foreign Application Priority Data

Apr. 2, 1996 [CA] Canada ................................ 2173315

[51] Int. Cl.⁶ .................................................. B01D 35/06
[52] U.S. Cl. ............................................ 210/222; 210/252
[58] Field of Search .................................. 210/222, 695, 210/252; 96/1, 2

[56] References Cited

U.S. PATENT DOCUMENTS

| | | |
|---|---|---|
| 3,088,481 | 5/1963 | Brueckner et al. . |
| 3,680,705 | 8/1972 | Happ et al. . |
| 3,714,953 | 2/1973 | Solvang . |
| 3,804,257 | 4/1974 | Sommermeyer . |
| 3,923,660 | 12/1975 | Kottmeier . |
| 4,116,839 | 9/1978 | Unkelbach et al. . |
| 4,289,621 | 9/1981 | O'Meara . |
| 4,320,003 | 3/1982 | Sanderson et al. . |
| 4,366,053 | 12/1982 | Lindler . |
| 4,390,423 | 6/1983 | Sundt . |
| 4,455,229 | 6/1984 | Sanderson et al. . |
| 4,532,040 | 7/1985 | Meeks et al. . |
| 4,611,615 | 9/1986 | Petrovic . |
| 4,772,387 | 9/1988 | Simoni . |
| 4,888,113 | 12/1989 | Holcomb . |
| 4,920,954 | 5/1990 | Alliger et al. . |
| 4,990,260 | 2/1991 | Pisani . |
| 4,999,106 | 3/1991 | Schindler . |
| 5,030,344 | 7/1991 | Ambrose . |
| 5,221,471 | 6/1993 | Huntley . |
| 5,227,683 | 7/1993 | Clair . |
| 5,238,558 | 8/1993 | Curtis . |
| 5,269,915 | 12/1993 | Clair . |
| 5,271,834 | 12/1993 | Mondiny . |
| 5,289,838 | 3/1994 | Odell . |
| 5,304,302 | 4/1994 | Bossert ..................................... 210/695 |
| 5,326,468 | 7/1994 | Cox . |
| 5,344,395 | 9/1994 | Whalen et al. . |
| 5,380,430 | 1/1995 | Overton et al. . |

FOREIGN PATENT DOCUMENTS

| | | |
|---|---|---|
| 1148114 | 6/1983 | Canada . |
| 0057500A1 | 8/1982 | European Pat. Off. . |
| 0119368A1 | 9/1984 | European Pat. Off. . |
| 3018854A1 | 11/1981 | Germany . |
| 3333551A1 | 3/1984 | Germany . |
| 2128414 | 4/1984 | United Kingdom . |
| WO83/02241 | 7/1983 | WIPO . |
| WO 85/03649 | 8/1985 | WIPO ..................................... 210/222 |

OTHER PUBLICATIONS

Paper Entitled Chemical Principles, Richard Dickerson, Harry B. Gray, Gilbert P. Haight, Jr., 1970, pp. 531–537.

*Primary Examiner*—Matthew O. Savage
*Attorney, Agent, or Firm*—Brian F. Russell; Andrew J. Dillon

[57] ABSTRACT

A method and apparatus for magnetic treatment of liquids. The method involves a single step of flowing the liquids through a plurality of magnetic fields, the magnetic fields alternating in field direction and progressively decreasing in field strength.

5 Claims, 4 Drawing Sheets

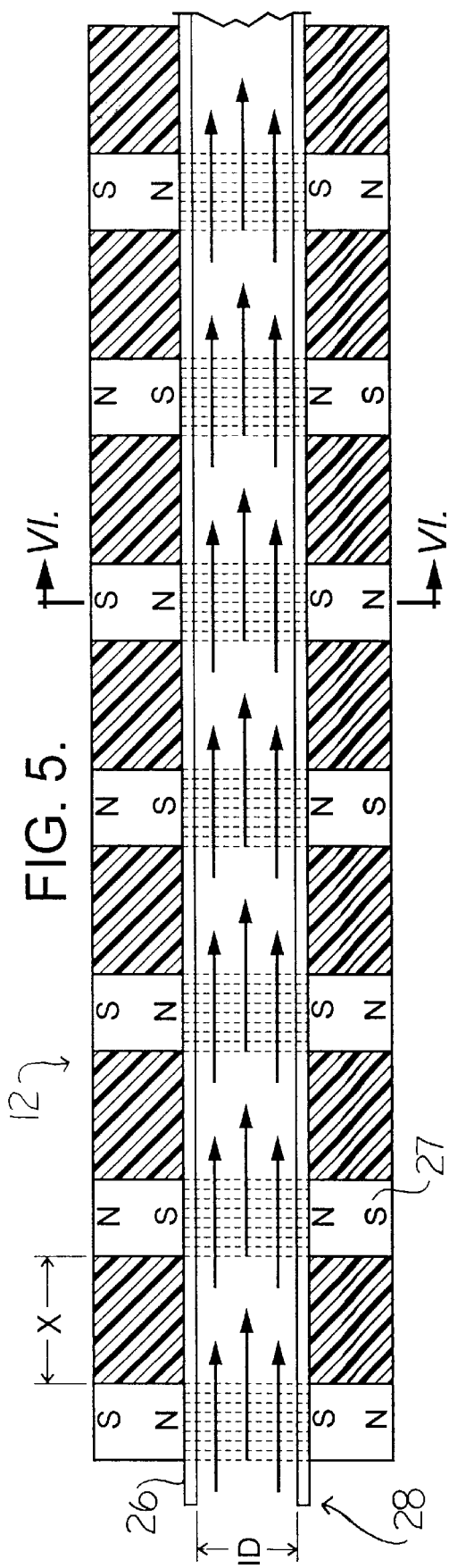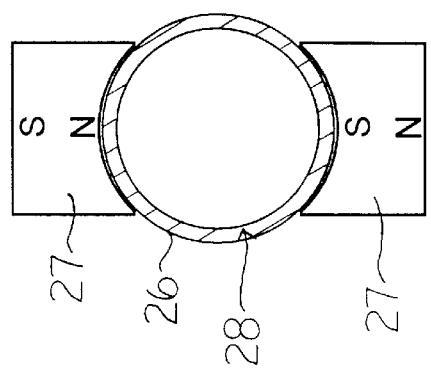

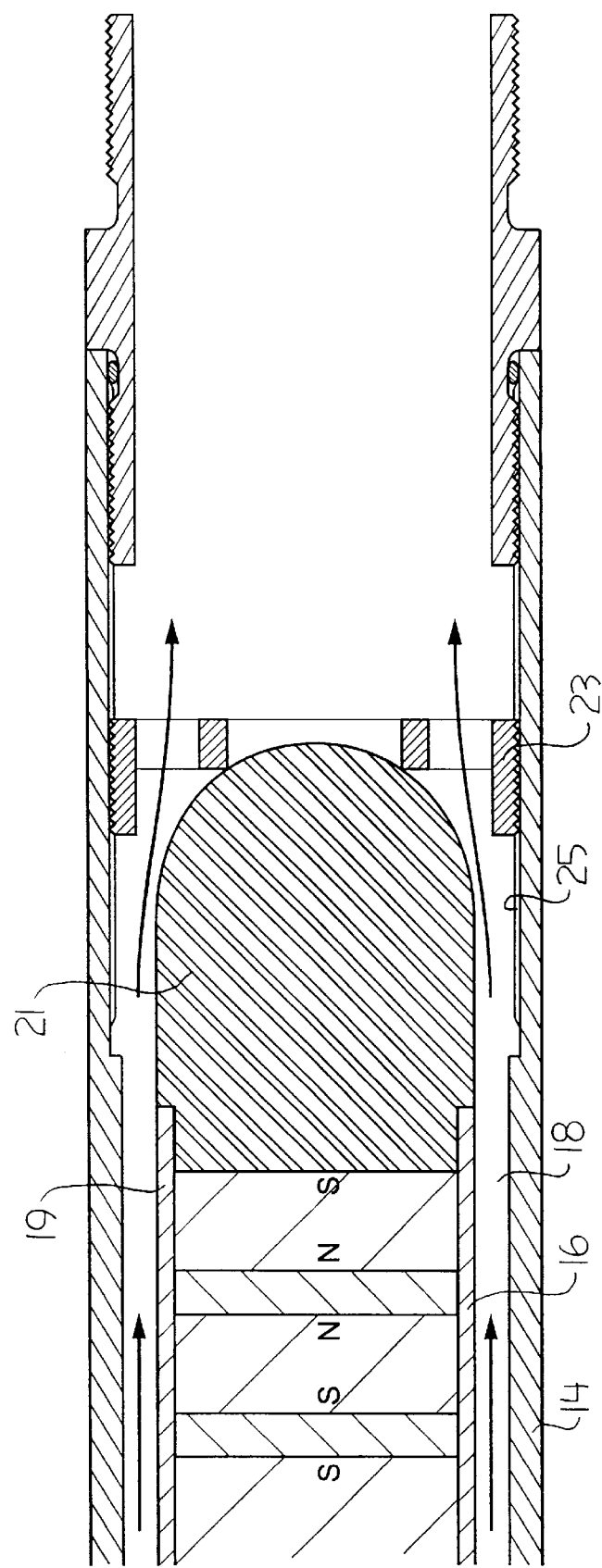

APPARATUS FOR MAGNETIC TREATMENT OF LIQUIDS

FIELD OF THE INVENTION

The present invention relates to a method and apparatus for the magnetic treatment of liquids.

BACKGROUND OF THE INVENTION

The magnetic treatment of liquids has a long history, which stems from a discovery that flowing a liquid through a cyclic-varying magnetic field reduces the build up of deposits in flow lines and associated equipment. The nature of the deposits varies with the liquid. With water, scale is deposited in the flow lines. With oil, wax and asphaltenes are deposited in the flow lines. U.S. Pat. No. 4,366,053, which issued to Lindler in 1982, and U.K. Patent Application 2,128,414, which De Vecchi published in 1984, are examples of a tool geometry which is still in use. These patents disclose a tubular body having a first end and a second end, an array of magnets positioned in end-to-end relation and centrally positioned within the tubular body, and an annular flow channel that extends between the first end and the second end of the tubular body. As a liquid flows through the tool, the liquid is subjected to a plurality of magnetic fields. Through trial and error, persons skilled in the art became aware that the apparatus for magnetic treatment of liquids, as described, worked in some applications, but not in others. Whenever the treatment failed, it was generally considered that the remedial action to be taken was to strengthen the magnetic field. Consequently, most of the patents in this field relate to changes in tool geometry intended to strengthen the magnetic field. Although some patents, such as U.S. Pat. No. 3,680,705, which issued to Happ in 1972, disclose magnetic treatment apparatuses having more elaborate or multiple flow paths.

An alternative tool geometry is disclosed in U.S. Pat. No. 4,888,113, which issued to Holcomb in 1989. The Holcomb reference discloses a magnetic array that can be mounted to an exterior of the tubular body in order to create a magnetic field within the flow channel. Recent patents, such as U.S. Pat. No. 5,221,471, which issued to Huntley in 1993, show that a tool geometry with magnets centrally positioned within the tubular body is still preferred. The Huntley reference discloses a refinement in securing and centralizing the magnets within the tubular body, but otherwise maintains the standard tool geometry previously described.

The problem in the prior art is best summarized by a quotation taken from column 1 of the Holcomb reference commencing at line 48:

"Our current body of knowledge does not resolve how to explain the observed phenomenon correctly. It is not understood whether the treatment phenomenon is due to changes which take place within the water itself or is due solely to influence on the impurities present in the water. The conclusions drawn by the various authors based on laboratory experimentation are inconclusive."

Holcomb goes on to describe his understanding of the phenomenon in column 1 at line 55:

"It is generally agreed that a magnetic field reduces the kinetics of crystallization processes and the freedom of movement of charged particles. The limitations of motion of particles in a field results in increases in the number of collisions and in the formation of crystallization centers. Magnetic treatment is effective if the liquid is passed between the poles of a magnet which has a sufficiently strong field and magnetic gradient, providing the temperature of the liquid is not too high."

In a paper entitled "On mechanisms of magnetic antiwaxing in petroleum," Geng Dianyu, Zhao Zhigang, Wang Hongqun, Xiao Chunlin, Liu Wei, and Zhang Zhidong of the Institute of Metal Research in China reduced the "sufficiently strong field" and "magnetic gradient" referred to by Holcomb to two formulas. The first formula provides a means for the calculation of a magnetic flux density that is sufficient to deliver the magnetic energy necessary. The second formula provides a means for calculating a sinusoidal DC magnetic field with a sufficient magnetic gradient. The Institute of Metal Research paper helps quantify known factors, but does not provide the needed further insight into the mechanism by which magnetic fluid conditioners reduce deposits in flow lines.

In summary, an absence of understanding of the underlying scientific theory behind the reduction of deposits in flow lines subjected to magnetic fields is currently preventing an advance in the methodology employed to reduce such deposits and, consequently, improvements to the apparatus constructed to carry out the methodology.

SUMMARY OF THE INVENTION

What is required is a method and apparatus for magnetic treatment of liquids that is based upon an enlightened understanding of the underlying scientific theory.

A scientific explanation for the phenomenon was sought. In working on a scientific explanation, a number of previously held theories were disproved. It was determined that there was insufficient energy generated by the magnetic fields to support any theory based upon the breaking of intramolecular or intermolecular bonds. It was determined that, while breaking of intermolecular bonds might be energetically possible, there was no apparent way to achieve sufficient energy through the mechanism of a magnetic field.

A theory related to demagnetization and dispersal of nucleation sites, however, appeared to be capable of explaining the effect. The explanation can be applied both to the treatment of oil to prevent wax deposition and to the treatment of water to prevent scale deposits. The case of wax deposition in oil flow lines will hereinafter be used for illustration. Submicroscopic particles of ferromagnetic material are generally present in a liquid in trace amounts. These particles are magnetized as a result of the influence of the earth's magnetic field over time. The magnetized particles tend to be attracted to the walls of any pipe. Once adhered to the walls of the pipe, the particles serve as nucleation sites and cause wax to deposit. However, when the particles move through several intense magnetic fields having alternating field directions, the individual particles can become demagnetized. Particles that had aggregated due to mutual attraction are also dispersed into many smaller particles, which will not be attracted to the walls of the pipe and can serve as wax nucleation sites in the liquid. The amount of wax and asphaltenes in oil after magnetic treatment remains the same as before the treatment took place. The wax and asphaltenes will either precipitate out on the interior walls of the pipe or will form into globules around particles which are carried away in the flow stream. Magnetic treatment of oil is effective when sufficient nucleation sites are created so that a significant fraction of the wax is transformed into small globules around particles and transported through the pipe without precipitation on the walls.

This explanation appears to be consistent with field experience with magnetic treatment devices. The reduced tendency of wax within magnetically treated oil to deposit on flow lines is known to be long-lasting. This is consistent with the theory that, once demagnetization has occurred, the ferromagnetic particles are not magnetized again for a considerable length of time. Wax accumulated around particles prevents them from coming in close proximity with each other, reducing the probability of further accumulation since the attraction between magnetized particles falls off very rapidly with distance. Prior to magnetic treatment, particles have a size of approximately 6.5 microns or larger. These particles have a much smaller average particle size after treatment. This greater understanding of the underlying theory allows improvements to be made in magnetic treatment methodology and, consequently, in tool geometry.

According to one aspect of the present invention there is provided a method for magnetic treatment of liquids. The method involves a single step of flowing the liquids through a plurality of magnetic fields, which alternate in field direction and have progressively decreasing field strength.

Once one understands the underlying scientific explanation for the phenomena is demagnetizing microscopic particles in the liquid, a change in methodology and apparatus is required. In addition to generating a first magnetic gradient, as identified in the article by the Institute of Metal Research, that is generally radial in relation to the flow path through a plurality of sinusoidal DC magnetic fields, a second magnetic gradient that is axial to the flow path should be provided by progressively decreasing the field strength of the plurality of sinusoidal DC magnetic fields along the flow path. Existing apparatus for the magnetic treatment of liquids maintain substantially consistent field strength throughout the tool. The fluid flow through these tools can be reversed with no appreciable change in the tools operation. Tools with substantially consistent field strength invariably leave a residual magnetization on a large proportion of the particles. The methodology, as described above, is expressly intended to minimize the number of particles which maintain a residual magnetization. This is accomplished through the use of slowly declining magnetic field strength.

According to another aspect of the present invention there is provided an apparatus for magnetic treatment of liquids which includes a tubular body having a first end, a second end, and a flow channel that extends between the first end and the second end. Means are provided for creating a plurality of magnetic fields that extend into the flow channel. The plurality of magnetic fields have alternating field directions and field strengths that progressively decrease between the first end and the second end.

Although beneficial results may be obtained through the use of the apparatus, as described above, the effectiveness of the apparatus is tied, in part, to the number of cycles. It is preferred that there be at least 5 cycles of alternating field directions.

The proportion of particles having a residual magnetization is dependent upon the field strength as the liquid exits the tool. The closer to zero flux that the declining magnetic field strength approaches, the lower the proportion of particles having a residual magnetization. It is, therefore, preferred that the field strength at the second end approaches zero.

The field strength at the first end of the tool is dependent upon the application. The applications in which a field strength of less than 2 Kilogauss can create a beneficial effect are extremely limited. It is, therefore, preferred that the field strength at the first end of the tool be at least 2 Kilogauss. In order to have a tool that is suitable for a wide range of applications, it is preferred that the field strength at the first end be greater than 6 Kilogauss and that field strength progressively decreases axially along the tool until the field strength at the second end approaches zero.

BRIEF DESCRIPTION OF THE DRAWINGS

These and other features of the invention will become more apparent from the following description in which reference is made to the appended drawings, wherein:

FIG. 5 is a side elevation view in a section of a second embodiment of an apparatus for magnetically treating a liquid constructed in accordance with the teachings of the present invention.

FIG. 6 is a transverse section view taken along section lines VI—VI of FIG. 5.

FIG. 7 is a detailed side elevation view in section of the first embodiment illustrated in FIG. 3.

DETAILED DESCRIPTION OF THE PREFERRED EMBODIMENT

Figure 1:
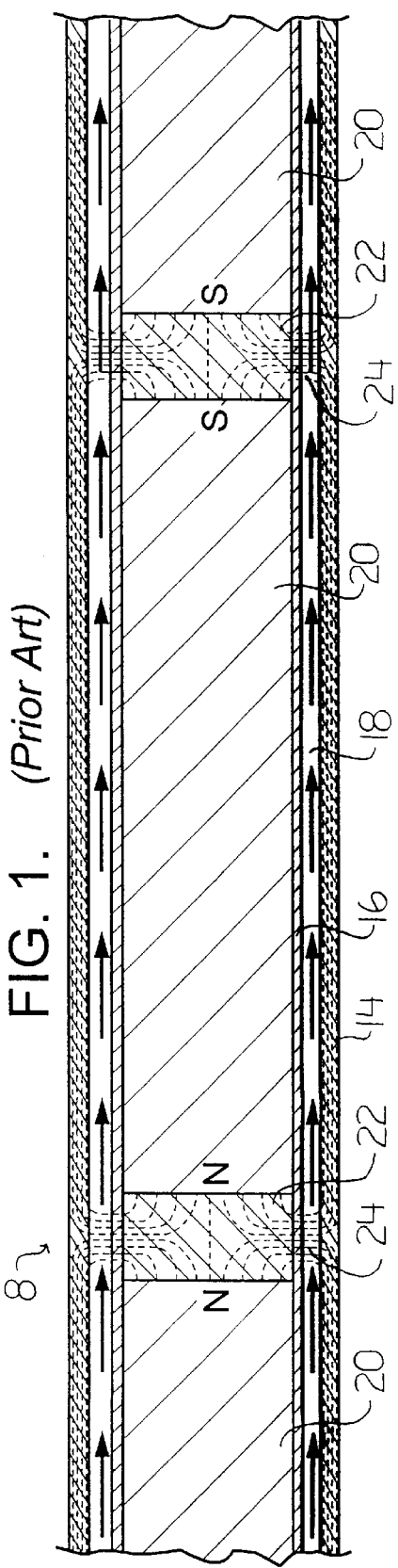
FIG. 1 is a side elevation view in a section of an apparatus for magnetically treating a liquid labelled as PRIOR ART.

A first embodiment and a second embodiment of an apparatus for magnetically treating a liquid generally identified by reference numerals 10 and 12, respectively, will now be described with reference to FIGS. 1 through 7.

Figure 2:
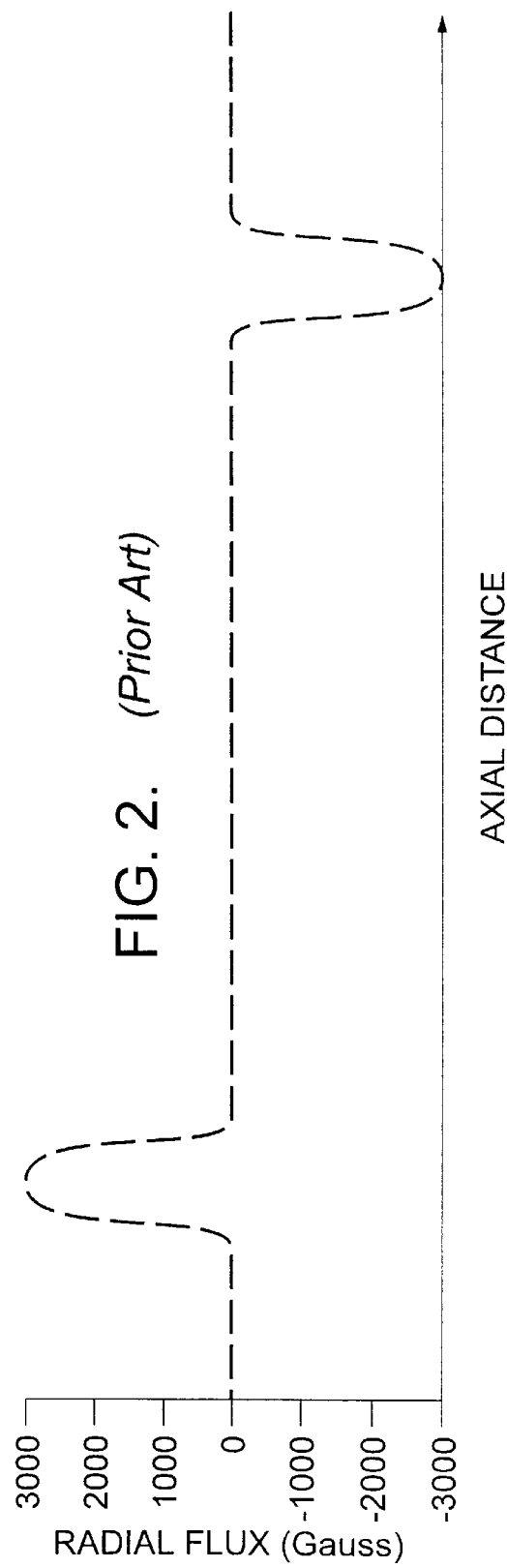
FIG. 2 is a graph labelled PRIOR ART showing the orientation of magnetic fields in the apparatus illustrated in FIG. 1.
Figure 4:
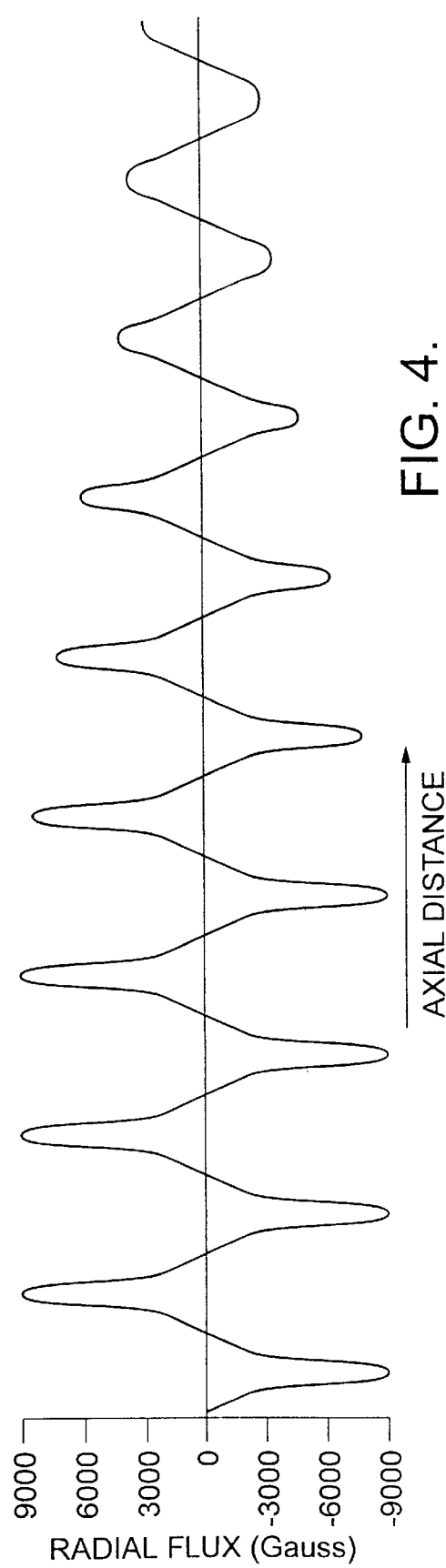
FIG. 4 is a graph showing the orientation of magnetic fields in accordance with the teachings of the present invention in the apparatus illustrated in FIG. 3.

Referring to FIG. 1, there is illustrated an apparatus for magnetically treating a liquid which is labelled as PRIOR ART, and will generally be referred to as apparatus 8. This tool includes a tubular outer housing 14 and a tubular inner housing 16. Centralizers (not shown) are used to concentrically align inner housing 16 within outer housing 14 to create an annular flow channel 18 which encircles inner housing 16. The flow channel is of constant cross-section and results in liquids travelling through the tool at a constant velocity. The combination of a constant cross-section with a constant velocity results in a constant flow rate. Several magnets 20 are arranged in end-to-end relation within inner housing 16. The magnets are separated by steel wafers 22. The magnets 20 are arranged with like poles immediately adjacent like poles; in other words, each North pole is adjacent to a North pole, and each South pole is adjacent to a South pole. The arrangements of magnets 20, as described, creates a plurality of magnetic fields 24 which extend into annular flow channel 18. The magnetic fields are all of equal strength. In some applications, the magnetic fields of 2 to 4 Kilogauss are used. In more demanding applications magnetic fields of 6 to 8 Kilogauss are used. As the liquid flows along annular flow channel 18, it encounters magnetic fields 24. The essence of the present method and the manner in which it represents a departure from teachings prevalent in the prior art can be illustrated by a comparison of FIG. 2 and FIG. 4. FIG. 2 represents the teachings prevalent in the prior art, and has been labelled PRIOR ART. The prior art teaches that the liquids are passed through a plurality of magnetic fields having equal strength and alternating field directions. The variation in magnetic field strength of each of the magnetic fields with respect to radial position defines a first magnetic gradient. This teaching is represented in FIG. 2 as a pseudo sine wave. The teaching of the present invention involves a modification in this methodology. In order to demagnetize a larger proportion of the particles, the present method involves using a second magnetic gradient of progressively declining field strength as represented in FIG. 4 by a pseudo sine wave that progressively decreases in amplitude. Apart from the application of the teaching represented in FIG. 4, the present method does not require a dramatic shift in tool geometry. The present methodology represents the best mode of demagnetizing the particles.

Figure 3:
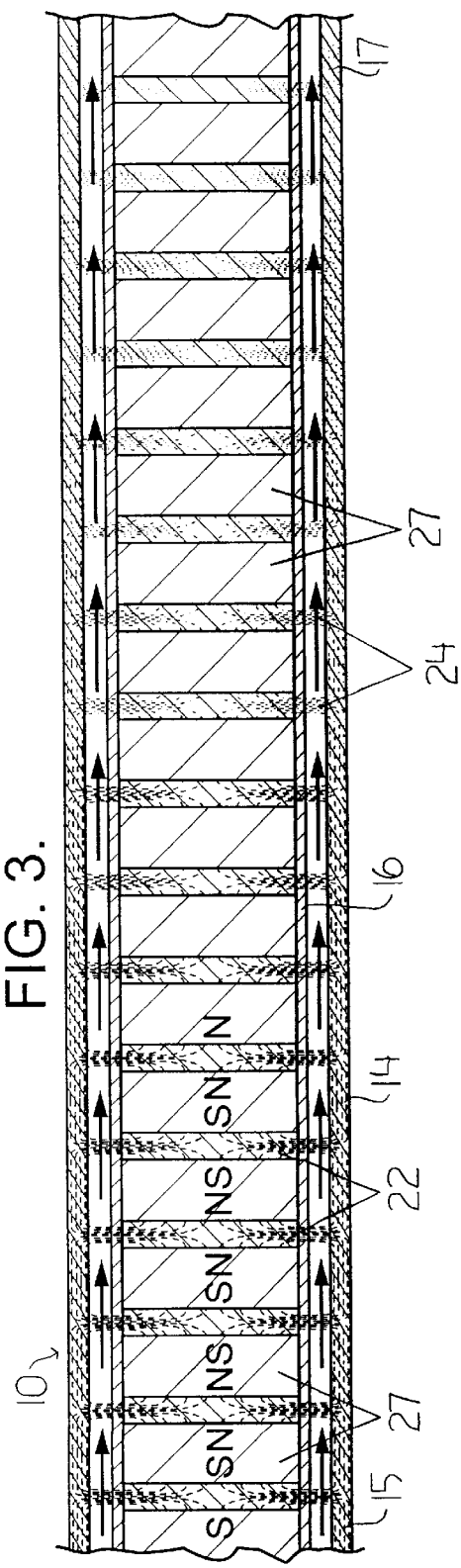
FIG. 3 is a side elevation view in a section of a first embodiment of an apparatus for magnetically treating a liquid constructed in accordance with the teachings of the present invention.

Referring to FIG. 3, apparatus 10 will now be described in detail. Where components used in apparatus 10 are similar to those in apparatus 8, common reference numerals will be used. Apparatus 10 includes a tubular outer housing 14 and a tubular inner housing 16. Outer housing 14 has a first end 15 and a second end 17. Referring to FIG. 7, the manner in which tubular inner housing 16 is centralized within tubular outer housing 14 is illustrated. Tubular inner housing 16 has opposed ends 19 in which are positioned closure members 21. Each of closure members 21 are received in centering collars 23 which threadedly engage an interior surface 25 of outer housing 14. When closure members 21 are positioned within centering collars 23, tubular inner housing is concentrically aligned within outer housing 14 to create an annular flow channel 18 which encircles inner housing 16. Referring to FIG. 3, several magnets 27 are arranged in end-to-end relation within inner housing 16. Magnets 27 are separated by steel wafers 22. Magnets 27 are arranged with like poles immediately adjacent like poles; in other words, each North pole is adjacent to a North pole, and each South pole is adjacent to a South pole. Unlike magnets 20 of apparatus 8, magnets 27 are of varying strength. They are arranged so the strongest of the magnets 27 are positioned adjacent first end 15 of outer housing 14 with the relative strength of the magnets 27 progressively declining in stages or groups toward second end 17. This arrangements of magnets 27 creates a plurality of DC magnetic fields 24, of declining strength, which extend into annular flow channel 18. As the liquid flows along annular flow channel 18 from first end 15 to housing 14 toward second end 17, it first encounters a number of strong magnetic fields and thereafter a number of progressively declining magnetic fields. The process, as described, demagnetizes and disperses submicroscopic particles in the liquid. This demagnetization is most effective when the magnetic fields progressively approach zero flux. It is preferred that the last grouping of magnets have a strength of 0.5 Kilogauss, bearing in mind that zero flux will be experienced immediately upon the liquid exiting the tool.

The geometry of the apparatus can be modified and still achieve demagnetization according to the teachings of the present invention. Two tools of differing geometry have been selected for illustration: apparatus 10 and apparatus 12. Apparatus 10 has a single flow channel. It will be appreciated that apparatus 10 can readily be modified to provide a plurality of flow channels, and there are a number of patents in the prior art illustrative of a multi-flow channel approach. The primary difference between apparatus 10, as illustrated in FIG. 3, and apparatus 12, as illustrated in FIGS. 5 and 6, lies in the means employed for creating a plurality of magnetic fields axially along the length of the tool. Both tools employ several magnets that are arranged in end-to-end relation. Referring to FIG. 3, in apparatus 10, the magnets are centrally positioned in the tubular body, creating annular flow channel 18. Referring to FIG. 5, in apparatus 12, pairs of magnets 27 are mounted to an exterior surface 26 of a pipe 28 conveying the liquid. Referring to FIG. 6, magnets 27 are placed in opposed relation. This tool geometry is primarily applicable to on-surface treatment applications or downhole applications with adequate flow rates. It is most effective when pipe 28 is non-ferrous, as ferrous pipe tends to distort the magnetic fields created. The spacing between magnets 27 axially along pipe 28, identified on FIG. 5 as distance "X", preferably exceeds the inner diameter of pipe 28, identified as "ID", because DC magnetic fields 24 tend to be formed between one magnet 27 and the closest of the other magnets 27. Therefore, in order to ensure that DC magnetic fields 24 cross the flow path of the liquid in pipe 28, the magnets 27 that are in opposed relation preferably represent the shortest path between opposing magnetic poles.

Other factors related to the successful practising of the invention will now be discussed. It has long been recognized by persons working with magnetic treatment of liquids that beneficial effects from magnetic treatment can only be obtained when the liquid is moving at sufficient speed. This relates to the velocity of the liquid, as opposed to the flow rate, as the velocity is a product of both the flow rate and the area of the flow channel. Previous experience has shown that when the velocity falls below 0.25 meters per second, it is difficult to achieve the desired results. It is necessary to maintain the velocity above that level and, preferably, in excess of 0.5 meters per second.

A cautionary note is necessary to differentiate between the size of a magnet and its relative field strength. Magnets of identical field strength can be obtained in a variety of sizes. In the prior art, magnets of varying size but of identical field strength were used in some applications. The necessity for different-sized magnets was dictated by the geometry of the tool. In this application, the size of the magnet is irrelevant; what is of critical importance is the field strength, which must progressively decrease along the axis of the tool in order to provide the second magnetic gradient necessary to achieve the desired demagnetization.

It will be apparent to one skilled in that art that the same result can be achieved by an assembly including a plurality of magnetic treatment apparatus in series. Although individual magnetic treatment apparatus may not have decreasing field strength, if the magnetic treatment apparatus in the series has gradually decreasing magnetic field strength, the magnetic treatment assembly, considered as a whole, achieves the desired demagnetization. It also will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for magnetic treatment of liquids, comprising:

a tubular body having a first end, a second end, and a flow channel that coaxially surrounds a central axis and extends from the first end to the second end; and a plurality of magnets arranged axially along the tubular body in spaced relation, the field strength of a first group of the plurality of magnets positioned at the first end of the tubular body being at least 2 Kilogauss, the field strength of a second group of the plurality of magnets positioned at the second end of the tubular body being less than 0.5 Kilogauss, wherein said plurality of magnets are arranged with like magnetic poles positioned adjacent one another to produce a plurality of adjacent magnetic fields of different magnetic polarities that extend into the flow channel, the plurality of magnetic fields extend generally perpendicularly to the central axis of the flow channel, and wherein the magnetic field strength of a third group of said plurality of magnets positioned between said first and second groups successively decreases in a direction axially from the first end toward said second end, wherein microscopic particles in liquid flowing through the flow channel are demagnetized.

2. The apparatus as defined in claim 1, wherein said plurality of magnetic fields include at least 5 pair of adjacent magnetic fields having opposite magnetic polarities.

3. The apparatus as defined in claim 1, wherein the plurality of magnets are arranged in end-to-end relation and centrally positioned in the tubular body, thereby making the flow channel annular.

4. An apparatus for magnetic treatment of liquids, comprising:

an outer tubular body having a first end, a second end, and a single flow channel that coaxially surrounds a central axis and extends between the first end and the second end;

an inner tubular body positioned in the flow channel of the outer tubular body;

means for coaxially aligning the inner tubular body with respect to said central axis within the flow channel of the outer tubular body, thereby making the flow channel annular; and several magnets arranged in end-to-end relation within the inner tubular body, the magnets being separated by spacers and oriented with like poles immediately adjacent one another, the magnets creating a plurality of magnetic fields of alternating magnetic polarity that extend perpendicularly to said central axis across the annular flow channel, the field strength of a first group of the several magnets at the first end of the outer tubular body being greater than 6 Kilogauss, with the field strength of a second group of the several magnets at the second end of the outer tubular body being less than 0.5 Kilogauss, the magnetic field strength of a third group of the several magnets located between said first and second groups successively decreasing in a direction axially along said outer tubular body from said first end toward said second end, wherein microscopic particles in liquid flowing through the flow channel are demagnetized.

5. In combination:

a plurality of apparatus for magnetic treatment of liquids, said plurality of apparatus being arranged in series to form a magnetic treatment assembly, each apparatus including:

tubular body having a first end, a second end, and at least one flow channel that extends between the first end and the second end; and a plurality of magnets arranged axially along the tubular body in spaced relation the field strength of one of the plurality of magnets positioned at the first end of the tubular body being at least 2 Kilogauss, the field strength of one of the plurality of magnets positioned at the second end of the tubular body being less than 0.5 Kilogauss creating a plurality of magnetic fields that extend into the flow channel, the plurality of magnetic fields providing a number of cycles of alternating field directions, the field strength of the plurality of magnetic fields in the magnetic treatment assembly progressively decreasing from the first end to the second end, such that microscopic particles in liquid flowing through the flow channel are demagnetized.

* * * * *